United States Patent [19]

Antonini

[11] Patent Number: 5,898,778
[45] Date of Patent: Apr. 27, 1999

[54] METHOD AND DEVICE FOR TEMPORARILY AUTHORIZING THE USE OF A PROGRAMME PROTECTED BY AN ELECTRONIC CARTRIDGE

[76] Inventor: Pierre Antonini, 3 rue Léon-Dierx, 75015 Paris, France

[21] Appl. No.: 08/673,719

[22] Filed: Jun. 27, 1996

[30] Foreign Application Priority Data

Jul. 5, 1995 [FR] France .................................. 95 08124

[51] Int. Cl.⁶ ............................... H04L 9/00; G06F 7/04; G06F 17/00; G06G 7/48
[52] U.S. Cl. ..................... 380/4; 340/825.3; 340/825.31; 364/479.04; 364/479.07
[58] Field of Search ............................. 380/4; 340/825.3, 340/825.31

[56] References Cited

U.S. PATENT DOCUMENTS

| 4,740,890 | 4/1988 | William ................................. 364/200 |
| 5,109,413 | 4/1992 | Comerford et al. ....................... 380/4 |
| 5,155,768 | 10/1992 | Matsuhara ................................ 380/23 |
| 5,212,729 | 5/1993 | Schafer ..................................... 380/4 |
| 5,392,351 | 2/1995 | Hasebe et al. ............................ 380/4 |
| 5,533,125 | 7/1996 | Bensimon et al. ........................ 380/4 |
| 5,564,038 | 10/1996 | Grantz ..................................... 395/491 |
| 5,586,301 | 12/1996 | Fisherman et al. ...................... 395/479 |
| 5,715,169 | 2/1998 | Noguchi ............................. 364/474.04 |

FOREIGN PATENT DOCUMENTS

| 0 430 734 | 5/1991 | European Pat. Off. . |
| 2267986 | 12/1993 | United Kingdom . |

*Primary Examiner*—Thomas H. Tarcza
*Assistant Examiner*—Hrayr A. Sayadian
*Attorney, Agent, or Firm*—Nilles & Nilles SC

[57] ABSTRACT

A method and device for authorizing execution of rented computer programs utilize a monostable element to determine usage time and a password to authorize use of the program for additional rental periods. The method and device involve a cartridge which is connected to the computer that executes the computer program. The cartridge is scanned in response to usage of the computer program (for example, the user typing on the computer keyboard). The scanning triggers a monostable element which remains in an active state for a predetermined amount of time, and time units are only counted while the monostable element is active. This permits a more accurate measurement of time during which the user is actually using the computer program. In order to authorize additional rental periods, a password scheme is utilized. The password scheme allows the cartridge and therefore the rental period to be reset from the computer, without the user having to physically obtain a new cartridge from the renter of the program or engage in some other type of physical exchange.

14 Claims, 4 Drawing Sheets

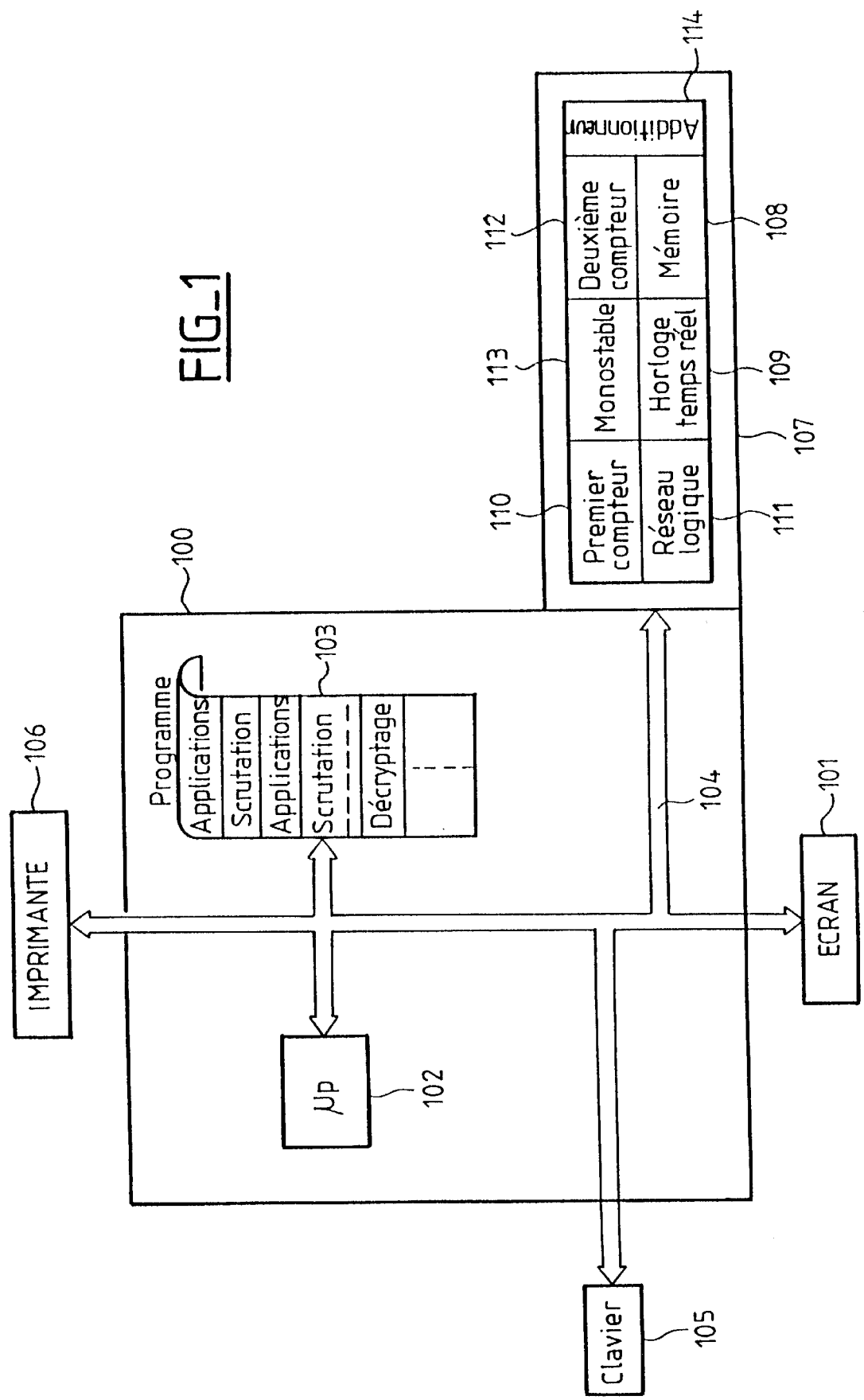
FIG_1

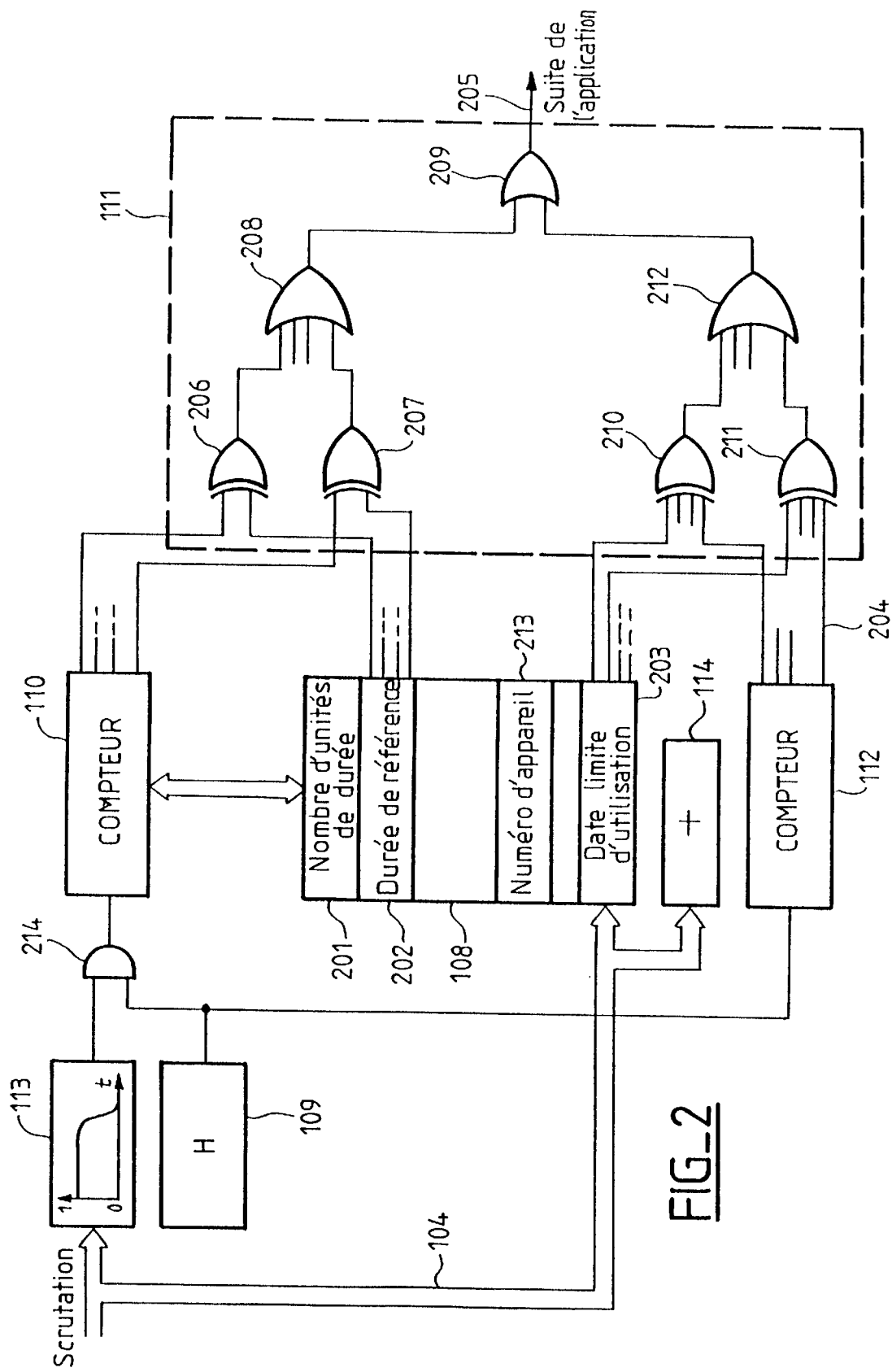
FIG_2

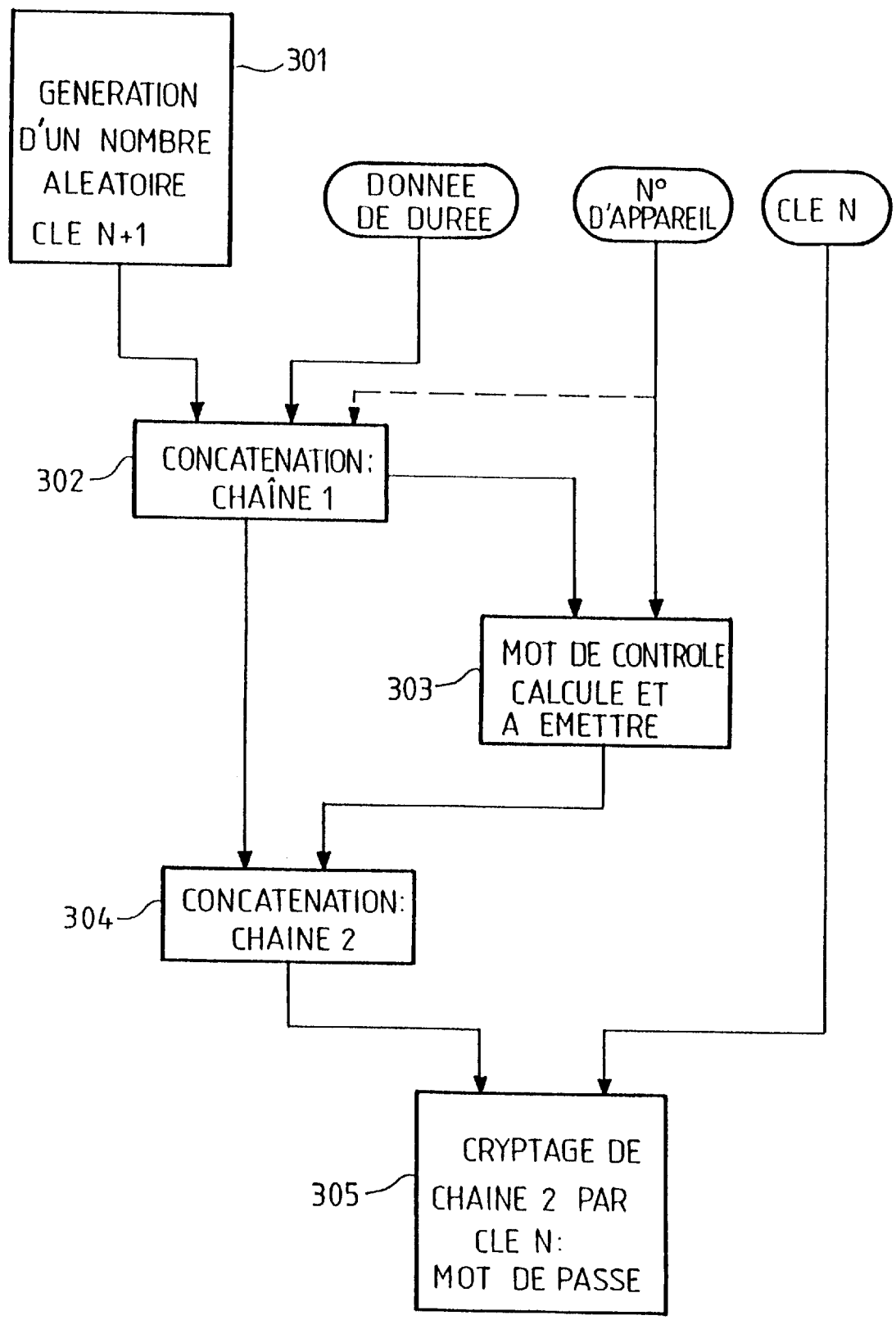

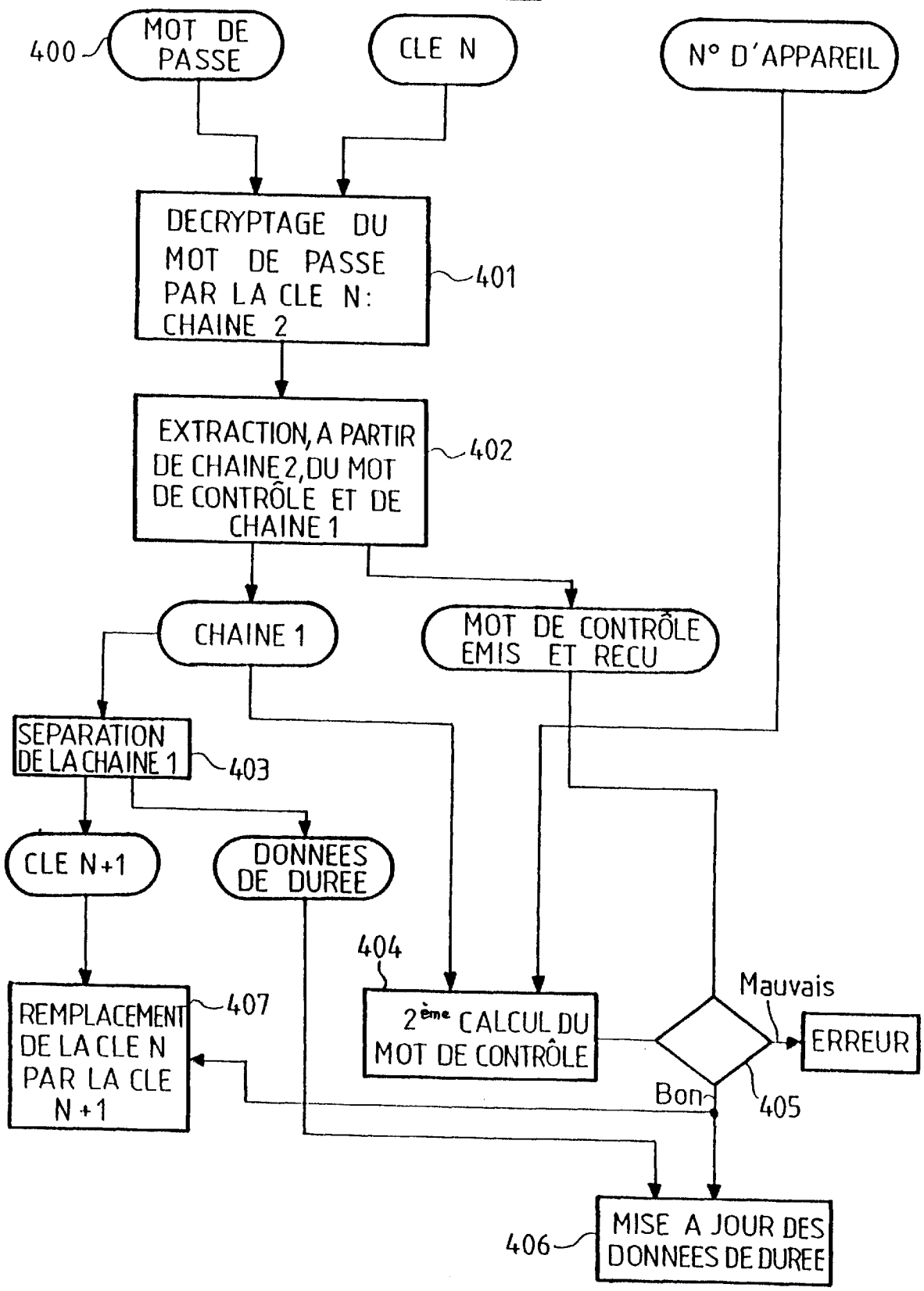

METHOD AND DEVICE FOR TEMPORARILY AUTHORIZING THE USE OF A PROGRAMME PROTECTED BY AN ELECTRONIC CARTRIDGE

BACKGROUND OF THE INVENTION

1. Field of the Invention

The present invention concerns methods and devices able to authorize the use of a program protected by an electronic cartridge. It is applicable more particularly to the renting of software or programs so as to be able to control the number of hours or a renting limit date. It could also be used for the renting of a machine, the program in question being in this instance the operating system of the machine.

2. Description of the Prior Art

Computer systems are increasingly used to operate devices. A large number of programs are available to the user to make the most of his equipment. These programs are used in a wide range of fields: management software, measuring software, etc. Generally, they are stored in memories integrated with the device. In the micro-computer field, these programs are stored in a magnetic memory known as a hard disk.

Problems of cost and fast obsolescence are urging industrialists to take these programs or renting software. Thus, programs are rented out to customers.

The renter then needs guarantees which provide against any possible abusive usage of his material by limiting renting to a certain number of hours of use or up to a certain date. This dissuades a dishonest customer from keeping the material longer than he ought to, copying the program onto another machine or even selling it.

To resolve these problems, various solutions have been put forward and a large number of systems have been studied. This is why an electronic cartridge system has appeared. The customer needs the cartridge to gain access to the software he rents. This cartridge is connected directly to the customer's computer system by means of a connector. The program can only function in the presence of this cartridge, because during its running, the program checks and periodically scans the presence of the cartridge and ensures that the period of validity is not used up or that the limit date of validity has not been surpassed. However, these systems are not highly adapted to the principle of renting. Firstly, at the end of the renting period, the software is no longer usable unless the cartridge is changed, which requires sending physical objects between the renter and his customer. Secondly, there are cartridges able to be reset by a smart card. In this case, the cartridge is basically a smart card reader (possibly with a standardized format). But this method also requires that the user send the smart card back to the renter to either change or reload it.

SUMMARY OF THE INVENTION

To obtain a less restrictive system and resolve the problem, the invention offers a method using an electronic cartridge able to be reset by a password. This password originates from an administrator of the method. This administrator is generally the renter. According to the invention, the password is converted into a complementary period entered in the cartridge. This conversion is effected by the protected program itself or by a separate specific program.

The invention also concerns a method for temporarily authorizing the use in a customer computer system of a program protected by an electronic cartridge, this method comprising the following steps:

the system scanning an electric state stored in the cartridge, the system authorizing the use of the program if this electric state corresponds to an expected state, verifying the validity of a usage period in the cartridge, and resetting the cartridge from the computer system for an additional period.

In addition, the invention also concerns a device represented by an electronic cartridge temporarily authorizing the use in a computer system of a protected program comprising a memory; a first counter and a second counter, a monostable element, an adder, a real time clock and a cabled logic network, wherein it comprises a circuit for being reset by a password.

BRIEF DESCRIPTION OF THE DRAWINGS

The characteristics of the invention shall appear more readily from a reading of the following description with reference to the accompanying drawings of which:

FIG. 1 shows the interconnection of the electronic cartridge with the computer system;

FIG. 2 shows an electronic diagram of the device used during a scanning;

FIG. 3 shows a flow chart of the production of a password with the administrator of the method;

FIG. 4 shows a flow chart of the processing of the password permitting the additional authorization of the use of the program.

DESCRIPTION OF THE PREFERRED EMBODIMENTS

FIG. 1 shows the various interconnections between the computer system and the electronic cartridge. This system comprises a central unit 100 comprising an arithmetical and logic unit or a microprocessor 102, a memory 103 and a bus 104 to carry addresses, commands and data. The central unit 101 is connected via the bus 104 with conventional peripheral units, such as a screen 101, a keyboard 105, an activating device 106 (a printer in this particular case) and an electronic cartridge 107. This cartridge comprises a memory 108 and in the invention a real time clock 109, a monostable element 113, an adder 114 and a cabled logic network 111. All the elements of the cartridge 107 are operationally connected to one another and with the bus 104. If the system 100–106 is a PC compatible microcomputer, the cartridge 107 may be connected externally to a parallel port or even in the form of an electronic card inside the device in a stand-by connector.

During execution of a protected program, the microprocessor 102 of the computer system 100–106 processes the instructions of an application represented by a program stored in the memory 103. It also periodically scans an electric state stored in the cartridge 107. The scannings are provoked by the action of an operator on a control element of the system, namely a keyboard. The scannings could be provoked by scanning instructions distributed in the protected stored program itself or by a pre-programmed program in the cartridge 107. They could also be provoked by instructions of another program when the microprocessor 102 would execute from time to time periodically or randomly and provoking an interruption (not seen by the user) of the stored program to be protected.

According to the invention, the microprocessor 102 takes charge of the password decrypting operations so as to reset the cartridge, as well as the operations for managing the memory 108 of the cartridge.

In one variant, one solution would consist of introducing a microcontroller into the cartridge. This microcontroller and its associated memory and sequencer would then take charge of the password decrypting operations and those for managing the memory 108.

FIG. 2 shows the details of the mechanism of scannings. The scanning of the system is effected in several steps: a step for counting down a number of period units, and a step for comparing a state 201 relating to the state of the counter 110 with a reference state 202 stored in the memory 108. This memory 108 is a non-volatile memory, generally an EPROM or EEPROM memory. It could also be a battery-safeguarded dynamic memory. In the invention, checking the validity of the usage period is effected by counting down a number of period units. The electronic cartridge comprises a counter 110 indicating via a state 201 stored in the memory 108 a number of period units remaining for the user. On each scanning, the monostable element 113 is reinitialized and becomes active. As long as the monostable element 113 is active, the counter is decremented by one unit on each pulse delivered by the clock 109 by means of an ET gate 214. It is also possible to count down the number of scannings instead of the number of period units. For checking, it is essential to ensure that the state of the counter does not equal a reference state 202, otherwise the running of the program is halted. In order to do this, the state 201 is compared with a reference state 202 stored in the memory 108. On each counting down, the state of the counter 110 is safeguarded in the memory 108 or the counter itself is a safeguarded counter.

To carry out the comparison between the number of period units 201 available for the user and the reference period 202, interconnected logic gates 206–207 and 208 are used in the cabled logic network 111. The gates 206–207 show in this example a set of exclusive OR gates in a number corresponding to the number of outlets of the counter 110 (or bits in the state 201) and bits in the reference state 202. Each exclusive OR gate receives a bit from the counter 110 and a bit corresponding to it in the reference state 202. The outputs of the gates 206 and 207 are collectively input-connected to an OR gate 208 with several inputs. When there is equality between the period 201 and the reference period 202, a low state appears at the outlet of the gate 208 and extends through an OR gate 209 of the network 111. This low state corresponding to a signal 205 is then transmitted to the computer system 100–106 by means of the bus 104. This low state is then utilized by the application software. This has the result of halting execution of the program of the application stored in the memory 103. Where the periods 201 and 202 are different, the signal 205 is a high state. As opposed to the previous case, this signal 205 shall authorize the computer system 100–106 to continue execution of the program stored in the memory 103. Although the signal 205 is intended here to be a binary state, moreover on one of the wires of the bus connecting the cartridge 107 to the computer system 100–106, it shall be preferable in reality that the message 205 is encrypted so as to prevent it being falsified. For example, the outlet of the gate 209 shall be connected to the input of a given combinational circuit, the application software comprising a sub-program for decrypting the signal written in the cartridge.

A second solution to check use validity consists of comparing a current date 204 originating from the counter 112 with a date pre-recorded in the memory 108 of the cartridge and corresponding to the limit use date 203. On each pulse of the real time clock 109, the counter 112 is incremented by one unit. The current date 204 is indicated by the state of the counter 112. In this second solution, the clock of the system 100–106 is preferably not used as the user easily has access to this and could then modify the current date 204. To compare the current date 204 originating from the clock 1089 and the limit use date 203, logic gates 210–211 and 212 are used interconnected in the cabled logic network 11 in the same way as for the gates 206–207 and 208. The reasoning of the phase for comparing the two dates 203 and 204 is identical to that concerning the periods 201 and 203. If dates are retained as day/month/year with one octet per character, 64 gates 210 or 211 are needed. The compared and stored dates shall preferably be encrypted dates.

In one preferred embodiment, the checking scanning is linked to an action of the operator on a control element, for example on the keyboard 105. Scanning reinitializes the monostable element 113. As long as the monostable element 113 is active, the counter 110 is authorized to count down the period units at the rate of the real time clock 109.

In another embodiment, the checking scanning is carried out every minute. The minute seems to be the most suitable period unit for this type of check. One check every hour would be too inaccurate, whereas one check every microsecond or every second would be too restrictive for the system.

Furthermore, the invention has the particular characteristic of the cartridge being able to be reset by way of a simple password. The protection of the program is moreover reenforced by the need of the user to know a former key in addition to the password so as to be able to extend the period of use of the program. The user shall previously have obtained this former key during the previous loading of the cartridge 107.

Thus, so as to be able to reset or resupply its cartridge, the invention offers an appropriate method appearing in the form of flow charts shown in FIGS. 3 and 4.

A first set of steps shown in FIG. 3 includes producing a password required for the user to have access to the protected program. This is carried out at the premises of the renter or administrator according to the request for extension of renting by the user. This password corresponds to at least a transformation of information representative of a data period, a customer device number, a former key N and a new key N+1. The period data concerns a period for a new usage. The former key N relates to a preceding period. The new key N+1 relates to the new usage period.

In a first step 301, a random number is created, this number being produced by known methods, with a fixed length which shall constitute a key N+1 and which shall represent a new key. The key N+1 is totally arbitrary.

In the next step 302, the new key N+1 is concatenated with the data of the new period granted to the customer so as to obtain a chain 1. The data of the new period is a value which shall either have been fixed in advance mutually agreed between the customer and the administrator or shall be defined at the time of the transaction.

Then in a step 303, a check word is created resulting for example from the sum of the characters of the chain 1 and a customer device number. This check word shall make it possible to check the accuracy of the password of the user in the password decrypting phase. Moreover, it is essential to note that the device number could have been concatenated with the chain 1 (link up in dashes) instead of introducing it into the check word.

In a next step 304, the chain 1 is concatenated with the check word so as to obtain a chain 2. Finally, the chain 2 is encrypted with a parametering function parametered by a former key N of the user (step 305) according to known algorithms so as to obtain a password. Reciprocal functions, such as the exclusive OR, may be used to carry out this encrypting. This password is then transmitted to the customer. It is also possible to use DES and RSA type functions. The concatenations of steps 302 and 304 may be of the same type or different (interlacing of bits, juxtaposition, data feedback, etc.).

When the customer has the password sent to him, it is processed during a second set of steps shown in FIG. 4. The first step 400 of this second series consists of entering the password into the computer system 100–106. This introduction can be made on the keyboard 105 by following, for example, the indications of an updated sub-program appearing on a screen 101 of the system 100–106. The sub-program is a sub-program in the application software or provided separately by the administrator. The key N stored in the memory 103 during a preceding session is extracted from it by the updated sub-program. If required, the user could enter the former key N so that the sub-program present in the memory 103 can decrypt the password using the former key N (step 401). The decrypting of the password results in the production of the chain 2 by the system 100–106. The sub-program extracts the chain 1 from this chain 2 and the check word by way of deconcatenation (step 402). Step 402 is the opposite of step 304. The extracted check word is the one originating from the administrator by way of the password.

Similarly, the new key N+1 and the period data are obtained by deconcatenating the chain 1 during a separation step 403 which is the opposite of step 302.

From here, the sub-program provokes a second calculation of the check word (step 404) from the chain 1 derived from the extraction step 402 and the customer device number. This device number is previously stored in the memory 108 of the cartridge 107 by the administrator.

The program then carries out an operation during a step 405 for comparing the check word extracted in step 402 with the check word calculated in step 404.

If there is no equality between the two check words, then an error phase is entered which results in locking the running of the program. Then actions can be provided concerning the program so as to prevent several successive attempts.

If there is equality, this means that the password entered by the user was correct. This is followed by a step 406 for refreshing the use period data in the memory 108 of the cartridge 107. In fact, the new period shall need to be added to the old period. The key N+1 is stored in the memory of the cartridge for use in a subsequent session. In another solution, the user shall retain the new key N+1 in place of the old key N for the next resetting of his cartridge 107.

The updating of the usage period data 201 in step 406 is carried out in a preferred example using an adder 114. This adder 114 is embodied from a microcontroller and is connected to the bus 104. It is able to read the number of units in the zone containing the number of period units 201 or in the register of the counter 110, receiving the period increment derived from the password, adding this number 201 to this increment and writing the result of this adding in this zone or this register. In another example, the sub-program, using the bus 104, forces a <<1>>, onto a high weight bit of the period data 202 stored in the memory 108 to the extent that this bit has moved to zero due to counting down. Thus, a certain number of period units are added to the old period data 201 without suppressing from it the units balance. If the period data is a date, the program completely erases the zone 203 so as to enter the new date, input being effected by means of the password.

The remaining usage period 201 may moreover be permanently displayed in one corner of the screen connected to the computer system to inform the user of the state of renting.

I claim:

1. A method of authorizing execution of a computer program protected by an electronic cartridge, the cartridge being connected to a computer system which executes the computer program, the cartridge authorizing use of the computer program for a first rental period of a first predetermined limited duration, the method comprising the steps of:

scanning the cartridge to ensure that usage of the computer program is authorized, the scanning step being performed in response to an action taken by an operator on a control element of the computer system, the scanning step resulting in the performance of the following steps triggering a monostable element, the monostable element assuming an active state upon being triggered and thereafter remaining in the active state for a predetermined amount of time before returning to an inactive state, counting units at the rate of a real time clock only while the monostable element is in the active state, the units representing time of usage of the computer program, comparing the counted units with a reference value, the reference value corresponding to the first rental period, and authorizing continued use of the computer program based on the comparing step; and resetting the cartridge from the computer a plurality of times so as to authorize use of the computer program for a plurality of additional rental periods of predetermined limited durations, each resetting step occurring in response to an entry of a password into one of the computer system and the cartridge.

2. A method according to claim 1, wherein the scanning step is performed each time an action is taken by an operator on a keyboard of the computer system.

3. A method according to claim 1, wherein the comparing step further comprises the step of comparing a current date with a date pre-recorded in the cartridge.

4. A method according to claim 1, wherein the resetting step further comprises:

introducing a password into the computer system, the password containing information representative of a period data element, a device number, a previous key N and a new key N+1;

interpreting the password on the basis of the previous key N so as to obtain from it the new key N+1 and the period data;

updating the usage period to reflect the second rental period; and replacing the previous key N with the new key N+1.

5. A method according to claim 4, wherein the following steps are performed prior to the performance of the introducing step:

generating a number forming the new key N+1;

concatenating the new key N+1 and the period data so as to obtain a first chain;

calculating a check word based on the device number and the first chain;

concatenating the first chain and the check word so as to obtain a second chain; and encrypting the second chain using the key N so as to obtain the password.

6. A method according to claim 5, wherein the following steps are performed after introducing and before the updating and replacing steps:

decrypting the password using the old key N so as to obtain the second chain;

deconcatenating the second chain so as to obtain the first chain and the check word;

deconcatenating the first chain so as to obtain a new key N+1 and a period data element;

recalculating, in one of the computer and the cartridge, the check word based on the first chain and the device number; and comparing the calculated check word with the recalculated check word;

and wherein the updating and replacing steps are performed after it is determined during the comparing step that both check words are consistent.

7. A method according to claim 5, wherein the new key N+1 is randomly generated.

8. A method according to claim 4, wherein the device number is entered which is at the disposal of the customer in a memory of one of the computer system and the cartridge.

9. A method according to claim 1, wherein the scanning step is performed every minute.

10. A method according to claim 1, wherein a remaining amount of a rental period is displayed.

11. An electronic cartridge for temporarily authorizing use of a protected program, the cartridge being connected to a computer system which executes the computer program, the cartridge authorizing use of the computer program for a first rental period of a first predetermined limited duration, the electronic cartridge comprising:

a real-time clock;

a monostable element, the monostable element being repetitively triggered by actual use of the computer program, the monostable element assuming an active state upon being triggered and thereafter remaining active for a predetermined amount of time before returning to an inactive state;

a counter, the counter being connected to the real-time clock and to the monostable element, the counter counting units at the rate of the real time clock only while the monostable element is in the active state, the counted units representing time of actual usage of the computer program, and the authorization of execution being based on the counted units; and means for resetting the cartridge in response to entry of a password, the resetting means being connected to the counter, and the cartridge being reset so as to authorize use of the computer program for a second rental period of a second predetermined limited duration.

12. An electronic cartridge according to claim 11, further comprising a limit usage date and a customer device number.

13. An electronic cartridge according to claim 11, wherein the counter is a first counter, and further comprising a second counter which delivers a current date.

14. An electronic cartridge according to claim 11, further comprising a cabled logic network for comparing the counted units with a reference value which corresponds to the first rental period.

* * * * *